United States Patent
Zdinak et al.

(10) Patent No.: US 6,614,981 B2
(45) Date of Patent: Sep. 2, 2003

(54) FIBER OPTIC CABLE RESTRAINT

(75) Inventors: Paul S. Zdinak, Candia, NH (US); Anthony R. Belanger, Dunbaston, NH (US)

(73) Assignee: Digital Lighwave, Inc., North Chelmsford, MA (US)

( * ) Notice: Subject to any disclaimer, the term of this patent is extended or adjusted under 35 U.S.C. 154(b) by 0 days.

(21) Appl. No.: 10/103,189

(22) Filed: Mar. 19, 2002

(65) Prior Publication Data

US 2002/0131751 A1 Sep. 19, 2002

Related U.S. Application Data

(60) Provisional application No. 60/277,373, filed on Mar. 19, 2001.

(51) Int. Cl.[7] .................................................. G02B 6/00
(52) U.S. Cl. ..................................................... 385/136
(58) Field of Search ........................ 174/58, 135, 168; 248/68.1, 74.1; 385/136, 137

(56) References Cited

U.S. PATENT DOCUMENTS

| | | | |
|---|---|---|---|
| D314,326 S | 2/1991 | Sachs ........................... D8/373 |
| 5,037,167 A | 8/1991 | Beaty .......................... 385/147 |
| 5,067,678 A | 11/1991 | Henneberger et al. ..... 248/68.1 |
| D331,006 S | 11/1992 | Dziedzic ..................... D8/356 |
| 5,316,243 A | 5/1994 | Henneberger ............... 248/68.1 |
| 5,589,667 A | * 12/1996 | Tsukazaki et al. .......... 174/135 |
| 5,640,482 A | 6/1997 | Barry et al. ................. 385/135 |
| D395,816 S | 7/1998 | Colodny ...................... D8/349 |
| 5,825,960 A | 10/1998 | Woodward et al. ......... 385/135 |
| 5,834,693 A | 11/1998 | Waddell et al. ............ 174/65 R |
| 5,868,362 A | * 2/1999 | Daoud .......................... 248/71 |
| D409,896 S | 5/1999 | Kaplan ........................ D8/356 |
| D411,950 S | 7/1999 | Dinh et al. .................. D8/356 |
| 5,918,837 A | 7/1999 | Vicain ......................... 248/49 |
| 5,953,477 A | 9/1999 | Wach et al. ................. 385/115 |
| D427,897 S | 7/2000 | Johnston et al. ............. D8/395 |
| D428,330 S | 7/2000 | Johnston et al. ............. D8/395 |
| 6,129,316 A | 10/2000 | Bauer ........................ 248/68.1 |
| 6,175,079 B1 | 1/2001 | Johnston et al. .............. 174/50 |
| 6,321,017 B1 | * 11/2001 | Janus et al. ................. 385/134 |
| 6,353,696 B1 | * 3/2002 | Gordon et al. ............. 385/135 |
| 6,370,246 B1 | * 4/2002 | Daoud ........................ 379/438 |
| 6,398,170 B1 | * 6/2002 | Wada ........................ 248/74.5 |
| 6,443,403 B1 | * 9/2002 | Page et al. .................... 248/71 |

* cited by examiner

Primary Examiner—Lynn Feild
Assistant Examiner—Thanh-Tam Le
(74) Attorney, Agent, or Firm—Jenkens & Gilchrist, P.C.

(57) ABSTRACT

A fiber optic cable restraint for holding wires in relation to an optical cabinet has a first portion coupled to an end of a base portion. A second portion is coupled to an opposing end of the base portion, such that the first portion, base portion, and second portion define an interior space. An end of the top portion and an end of the bottom portion define an open area that communicates with the interior space. A first pin extends downward from the first portion and is axially offset from a second pin extends upwardly from the second portion. The first portion, base portion, and second portion each have a curved surface that guides the fiber optic cable through the interior space in a manner that minimizes the possibility of damaging the fiber optic cable.

19 Claims, 3 Drawing Sheets

FIBER OPTIC CABLE RESTRAINT

This application claims the benefit of provisional application No. 60/277,373, filed Mar. 19, 2001.

FIELD OF THE INVENTION

This invention relates to organizing one or multiple cables, and more particularly to cable restraints for securing one or multiple fiber optic cables in relation to a stationary object.

BACKGROUND OF THE INVENTION

An optical networking device usually has multiple fiber optic cables attached thereto that feed data into and out of the device. For matters of convenience and space efficiency, several optical networking devices are installed together in close relation in a vertically stacked component rack. The fiber optic cables approach the devices from all directions and are individually routed to different ones of the optical networking devices. The close arrangement of networking devices and the large number of optical cables impose significant space limitations on routing the cables to and from the devices. Accordingly, a fair amount of effort is taken to organize the cable routing.

Various devices have been developed to organize the fiber optic cables in relation to the housing of the optical networking device. In general, such devices (i.e. cable restraints) mount to the housing of the networking device, the component rack, or other convenient structure and capture one or multiple cables to hold the cables in relation to the device. It is desirable for cable restraints to be inexpensive to manufacture and easy to use. Restraints that incorporate moving parts will eventually wear out, and are more prone to breaking than restraints with no moving parts. Finally, it is desirable that the cable restrain not induce tight bends in the fiber optic cables, as such bends may damage the cables.

There is a need for a cable restraint that is simple to use, inexpensive to manufacture and incorporates all the features discussed above.

SUMMARY OF THE INVENTION

The invention is drawn to a cable restraint device for fiber optic cable management that is simple, incorporates no moving parts, and protects the fiber optic cable from damaging tight bends.

An embodiment of the invention is a cable restraint device that includes a base portion having a first end and a second end. A first portion of the device has an open end and a closed end, and the closed end is in communication with the second end of the base portion. A second portion of the device has an open end and a closed end, and the closed end is in communication with the first end of the base portion. The base portion, the first portion and the second portion define an interior space. The open end of the first portion and the open end of the second portion define an open area that communicates with the interior space. A first pin extends downwardly from the open end of the first portion, and a second pin extends upwardly from the open end of the second portion. The second pin is axially offset from the first pin, and an end of the first pin is closer to the open end of the second portion than an end of the second pin.

In another embodiment, an optical networking system includes a cabinet for housing an optical networking device having a back wall, a first side wall and a second side wall. A first cable restraint is affixed to the first side wall, and a second cable restraint affixed to the second side wall. The first cable restraint defines an interior space, and has a downwardly extending pin axially offset from an upwardly extending pin. An end of the downwardly extending pin is lower than and end of the upwardly extending pin. The second cable restraint also defines an interior space, and has a downwardly extending pin axially offset from an upwardly extending pin. An end of the downwardly extending pin of the second cable restraint is lower than and end of the upwardly extending pin of the second cable restraint. At least one optical fiber extends through the interior space of one of the first cable restraint and the second cable restraint, and is retained within the interior space by the downwardly extending pin and the upwardly extending pin.

The features and advantages of the device according to embodiments of this invention will be apparent from the following detailed description of the embodiments thereof, given by way of example with reference to the accompanying drawings.

DETAILED DESCRIPTION OF THE INVENTION

The present invention will now be described more fully hereinafter with reference to the accompanying drawings in which exemplary embodiments of the invention are shown. This invention may, however, be embodied in many different forms and should not be construed as being limited to the embodiments set forth herein. Rather, the embodiments are provided so that this disclosure will be thorough and complete, and will fully convey the scope of the invention to those skilled in the art.

Figure 5:
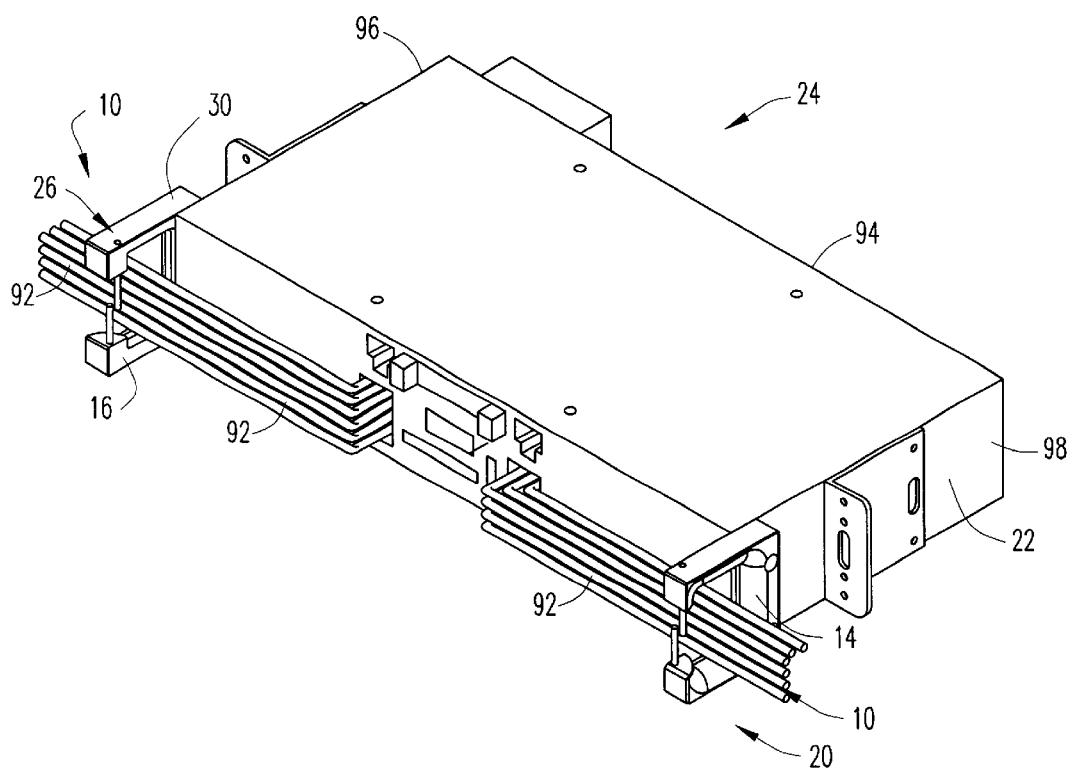
FIG. 5 is a perspective view of a pair of cable restraints as shown in FIGS. 1 through 4, mounted on an optical cabinet.
Figure 6:
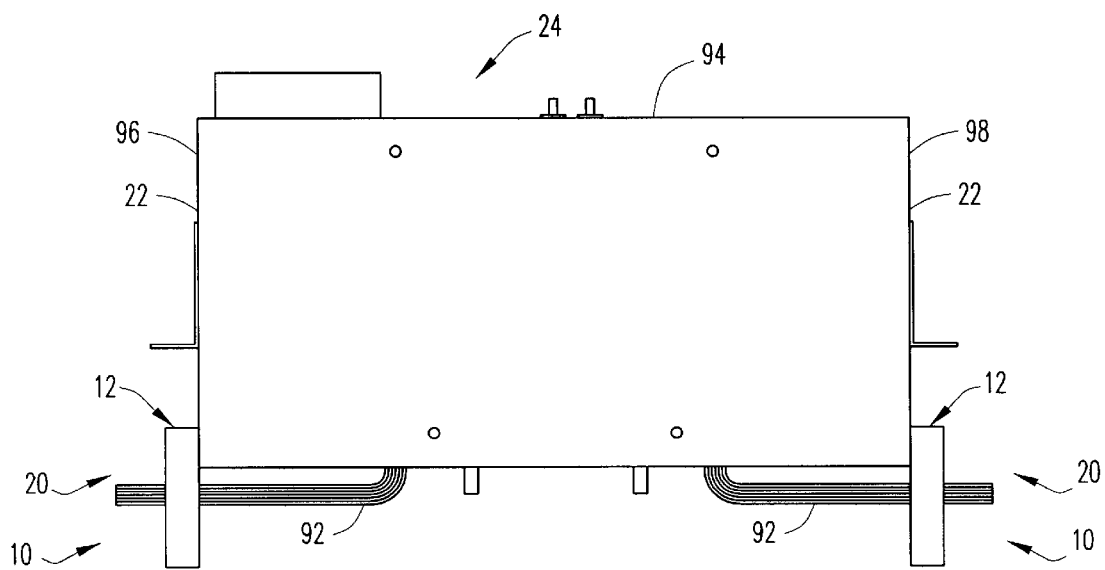
FIG. 6 is a top view of the pair of cable restraints and the optical cabinet of FIG. 5.

Referring now to FIGS. 1 through 6, a bracket or cable restraint 10 for fiber optic cable management is shown. As used herein, the term "fiber optic cable" can mean a single fiber optic fiber or multiple fiber optic fibers bundled together. The cable restraint 10 has a base piece 12. In an exemplary embodiment, base piece 12 can have a height of 3.470 inches. Base piece 12 has a curved surface 14, a flat side surface 16, and a flat back surface 18. Curved surface 14 can be located on a cable receiving side 20 of cable restraint 10. In an exemplary embodiment, curved surface 14 can have a radius of curvature of 0.5 inches. The flat side surface 16 is provided for engaging a side wall 22 of an optical cabinet 24 (FIGS. 5 and 6), and can be recessed relative to other portions of the cable restraint 10. The flat side surface 16 can optionally include an alignment edge 17 running the length of the base piece 12 and adapted to abut an edge of the optical cabinet 24. The alignment edge 17 serves to position and retain the cable restraint 10 in alignment with the edge of the cabinet 24, for example, in perpendicular relation as seen in FIGS. 5 and 6.

Cable restraint 10 also has a first portion or top piece 26. In an exemplary embodiment, top piece 26 can have a length of 3.24 inches. Top piece 26 also has a curved surface 28, a flat upper surface 30, and a flat front surface 32. In an exemplary embodiment, the curved surface 28 can have a radius of curvature of 0.5 inches. Open end 36 may include the front surface 32. Top piece 26 has a closed end 34 and an open end 36. Closed end 34 communicates with base piece 12. Top piece 26 may be integral with base piece 12 or attached thereto. Although "top", "bottom", "front" and "back" are used to refer to various elements within the specification and claims, it should be understood that the cable restraint 10 of the invention may be utilized in any orientation.

Cable restraint 10 additionally has a second portion or bottom piece 38. In a exemplary embodiment, bottom piece 38 can have a length of 3.24 inches. Bottom piece 38 has a curved surface 40, a flat side surface 42, and flat front surface 44. In an exemplary embodiment, curved surface 40 can have a radius of curvature of 0.50 inches. Bottom piece 38 has a closed end 46 and an open end 48. Closed end 46 of bottom piece 38 communicates with base piece 12. Open end 48 can include front surface 44. Bottom piece 26 may be integral with base piece 12 or attached thereto.

The curved surface 14 of base piece 12, the curved surface 28 of top piece 26 and the curved surface 40 of bottom piece 38 define an approximately rectangular C-shaped interior space 50. Although interior space 50 is shown and described as being approximately rectangular in shape, it should be understood that other shapes may be used, including circular, oval, octagonal, triangular or other shapes. Interior space 50 is further defined by corners 52, 54, 56, and 58 which are formed at the intersections of surfaces 14, 28, and 40. Corners 52, 54, 56, and 58 each have a curved surface having a radius of curvature that substantially matches the radius of curvature of the curved surfaces 14, 28, and 40 of adjoining pieces such that a smooth (i.e. without sharp corners) perimeter 60 of the interior space 50 is defined. Further, while exemplary dimensions for the radius of curvature of the curved surfaces 14, 28, and 40 have been provided above, the radius of curvature of the curved surfaces 14, 28, and 40 (and corners 52, 54, 56, and 58) can be chosen as a function of the minimum bend radius that a fiber optic cable can achieve without damage. Thus, in an exemplary embodiment the radius of curvature of curved surfaces 14, 28, and 40 and corners 52, 54, 56, and 58 can be greater than the minimum bend radius, such that as a fiber optic cable curves around the curved surfaces 14, 28, and 40 and corners 52, 54, 56, and 58, the cable restraint 10 will not induce a point curvature in the cable that would be smaller than the minimum bend radius and potentially damage the fiber optic cable.

Figure 1:
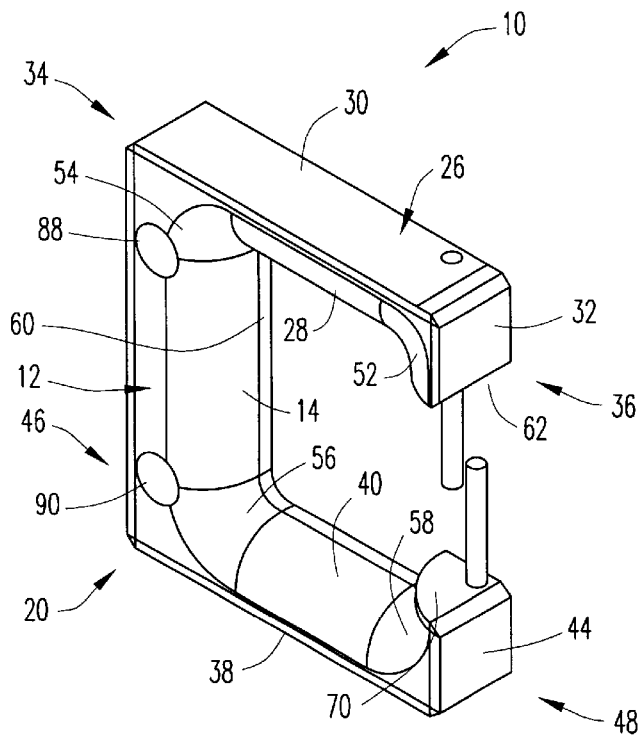
FIG. 1 is perspective view of a cable restraint for fiber optic cable management.
Figure 2:
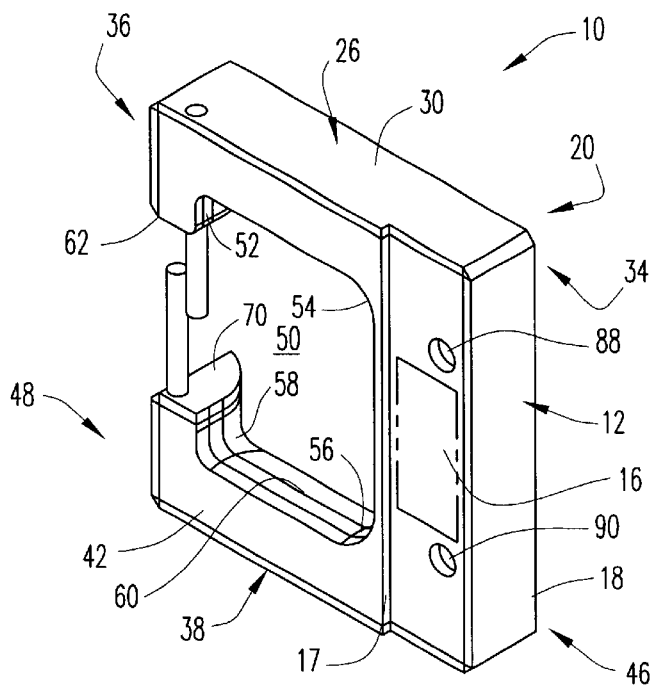
FIG. 2 is a rear perspective view of the cable restraint of FIG. 1.
Figure 3:
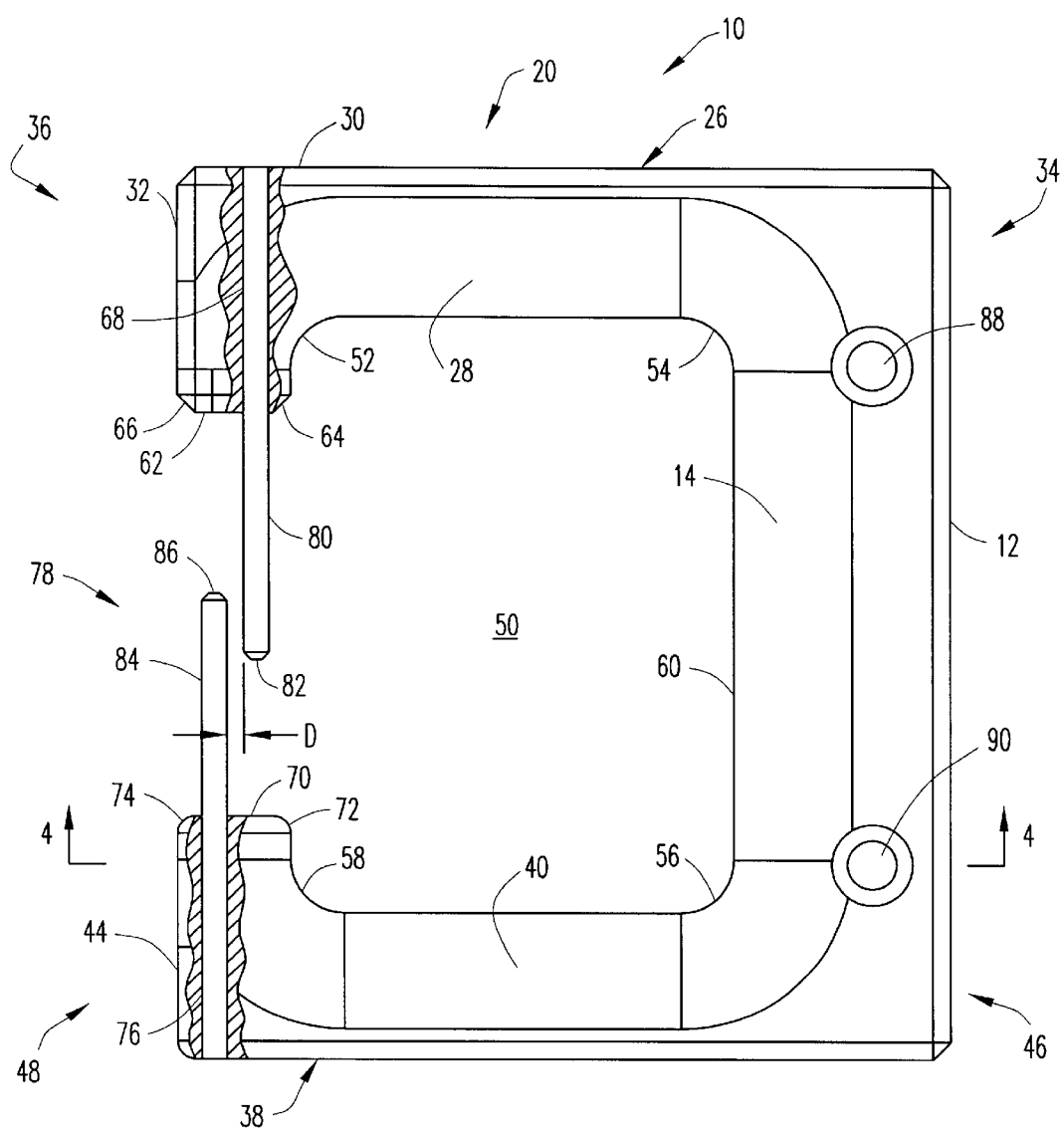
FIG. 3 is a front elevational view of the cable restraint of FIG. 1.
Figure 4:
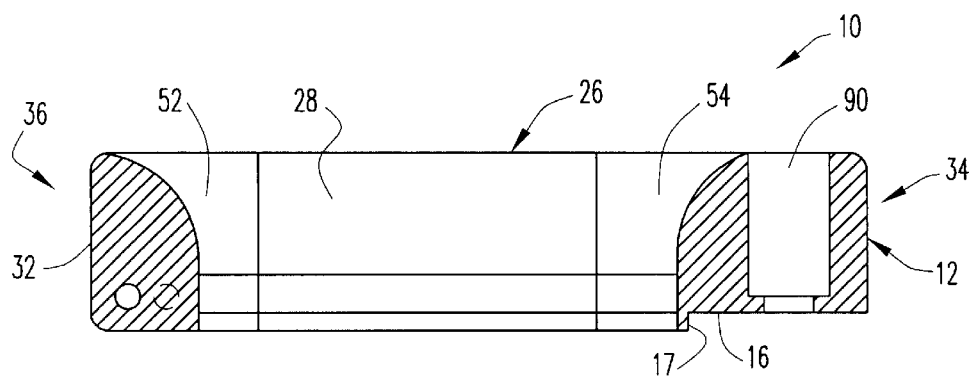
FIG. 4 is a cross-sectional view taken along line 4—4 of FIG. 3.

Referring now primarily to FIG. 3, open end 36 of top piece 26 has an interior facing surface or downwardly facing surface 62. Downwardly facing surface 62 has an inside edge 64 and an outside edge 66. In an exemplary embodiment, the downwardly facing surface 62 can have a first hole 68 positioned proximate the inside edge 64 of downwardly facing surface 62. Additionally, first hole 68 is positioned proximate curved surface 28 of top piece 26, such that first hole 68 is located proximate a corner of the downwardly facing surface 62 rather than being centered on downwardly facing surface 62.

Still referring to FIG. 3, open end 48 of bottom piece 38 has an interior facing surface or upwardly facing surface 70, having an inside edge 72 and an outside edge 74. The upwardly facing surface 70 is positioned substantially directly below the downwardly facing surface 62. Additionally, the upwardly facing surface 70 faces the downwardly facing surface 62. Upwardly facing surface 70 has a second hole 76 positioned proximate the outside edge 74 and proximate the flat side surface 44 of the bottom piece 38. Therefore, second hole 76 is located proximate a corner of the upwardly facing surface 70. Additionally, first hole 68 and second hole 76 are axially offset from one another, rather than being in vertical alignment with one another.

Still referring to FIG. 3, downwardly facing surface 62 of the top piece 26 and the upwardly facing surface 70 of the bottom piece 38 define an open area 78 that communicates with interior space 50. In an exemplary embodiment, open area 78 has a height of 1.57 inches. Top piece 26 and bottom piece 38 may each be shaped to extend inward toward one another near their respective open ends 36 and 48 such that a distance between downward facing surface 62 and upward facing surface 70 (i.e. the height dimension of the open area 78) is less than a distance between the curved surface 28 and the curved surface 40 (i.e. the height dimension of the interior space 50).

A first pin 80 is located within first hole 68. Alternately, first pin 80 is integral to the top piece 26 (such that no first hole 68 is needed). First pin 80 has a bottom surface 82. First pin 80 extends downwardly from downwardly facing surface 62. In an exemplary embodiment, first pin 80 extends a distance of 0.9 inches downwardly from downwardly facing surface 62. The first pin 80 can be cylindrical as show in the Figures, or may be of another shape, for example, having a rectangular, triangular, or other polygonal or curved cross-section. A cross-sectional dimension of the first pin 80 can be less than the thickness (i.e. the width of upper flat surface 30) of the top portion 26.

A second pin 84 is located in second hole 76. Alternately, the second pin 84 is integral to the bottom piece 38 (such that no second hole 76 is needed). The second pin 84 has a top surface 86. Second pin 84 extends upwardly from upwardly facing surface 70. In an exemplary embodiment, second pin 84 extends upwardly a distance of 0.9 inches. The second pin 84 can also be cylindrical as show in the Figures, or may be of another shape, for example, having a rectangular, triangular, or other polygonal or curved cross-section. A cross-sectional dimension of the second pin 80 can be less than the thickness (i.e. the width of lower flat surface 42) of the bottom portion 38. The first pin 80 and the second pin 84 can be supported in rigid relation, so that the pins cannot easily be moved relative to one another or relative to top piece 26 and bottom piece 38. Alternately, the first pin 80 and the second pin 84 can be supported such that the top and bottom pieces 26 and 38 are flexible, or the mounting of pins 80 and 84 are flexible, and allow relative movement of the pins 80 and 84.

In an exemplary embodiment, the bottom surface 82 of the first pin 80 is lower than the top surface 86 of the second pin 84. In other words, the bottom surface 82 of the first pin 80 is closer to the upward facing surface 40 than the top surface 86 of the second pin 84, and the top surface 86 of second pin 84 is closer to the downward facing surface 62 of the top piece 26. Consequently, the open area 78 is partially obstructed by the offset pins 80 and 84. The axis of pins 80 and 84 is substantially parallel. In an exemplary embodiment, a closest distance D (FIG. 3) between the first pin 80 and the second pin 84 measured perpendicular to the pins is slightly larger than a diameter of the fiber optic cable for which the cable restraint 10 is constructed to receive.

Cable restraint 10 can be provided with a first mounting hole 88 and a second mounting hole 90 defined laterally through base piece 12. One use of cable restraint 10 is with a cabinet 24 of an optical communications device (FIGS. 5 and 6). A typical optical cabinet 24 has a back wall 94, a first side wall 96 and a second side wall 98. Cabinet 24 is capable of housing an optical communications device that has one or more cable jacks disposed on a surface of the cabinet 24 for receiving one or more optical cables. Mounting holes 88 and 90 in the cable restraint 10 are used to secure the cable restraint 10 to side walls 96 and 98 of optical cabinet 24. Mounting holes 88 and 90 can thus be spaced to correspond to existing holes on the optical cabinet 24, or can be spaced as otherwise is convenient. One or more mounting holes 88 and 90 can be provided with female threads for threading engagement of a screw, bolt, or other fastener (not specifically shown), or the mounting holes 88 and 90 can be smooth for easy passage of a fastener therethough. Further, mounting holes 88 and 90 can be countersunk to receive the head of a fastener flush with or below the surface of the cable restraint 10. In an exemplary embodiment, the mounting holes 88 and 90 are provided in the base piece 12 opposite the open area 78; however the mounting holes 88 and 90 may be provided in other areas of the cable restraint 10 dependent on the particular application. More or fewer mounting holes can also be provided.

In practice, the cable restraint 10 is used to contain one or multiple of fiber optic cables 92 that connect with the cabinet 24 or pass in proximity to the cabinet 24. One or more cable restraints 10 can be mounted to the cabinet 24 with their respective curved surfaces 14, 28, 40 facing outwardly away from other cable restraints 10. The first pin 80 extends from first hole 68 downwardly to partially obstruct open area 78 between the top piece 26 and bottom piece 38. Similarly, the second pin 84 extends upwardly from second hole 76 to partially obstruct open area 78. Therefore, to secure fiber optic cables within the interior space 50 of the cable restraint 10, the cables must be manipulated such that a length of the cable passes above the top surface 86 of second pin 84 and manipulated to pass beneath bottom surface 82 of the first pin 80. By requiring that a length of cable be moved in a path around bottom surface 82 and top surface 86 of pins 80 and 84, respectively, to enter or exit the interior space 50, the likelihood that a fiber optic cable will inadvertently escape from interior space 50 of cable restraint 10 is reduced. Nevertheless, the simple downward and upward movement required to locate the cable within the interior space 50 of the cable restraint 10 is easily accomplished and is not unduly burdensome to a user. Additionally, the distance between the pins 80 and 84 further reduces the likelihood that a fiber optic cable will escape from interior space 50 of the cable restraint 10. Additionally, the curved surfaces 14, 28, 40, and curved corners 52, 54, 56, and 58 minimize the likelihood that the fiber optic cables will be damaged from excessive bending.

It is therefore believed that the present invention will be apparent from the foregoing description. It should be obvious that various changes and modifications may be made from to the devices described and shown herein without depicting from the spirit and scope of the invention as defined in the following claims. For example, the cable restraint of the invention can be used with other types of cables than fiber optic cables. Additionally, the cable restraint of the invention can be mounted to other stationary objects than the optical device cabinet described herein.

What is claimed is:

1. A cable restraint for fiber optic cable management comprising:
    a base portion having a first end and a second end;
    a first portion having an open end and a closed end, said closed end in communication with said second end of said base portion;
    a second portion having an open end and a closed end, said closed end in communication with said first end of said base portion, such that said base portion, said first portion and said second portion define an interior space, and said open end of said first portion and said open end of said second portion define an open area that communicates with said interior space;
    a first pin extending from said open end of said first portion towards said open end of said second portion; and
    a second pin extending from said open end of said second portion towards said open end of said first portion and axially offset from said first pin; and
    wherein an end of the first pin is closer to said open end of said second portion than an end of the second pin; and
    wherein said base portion, said first portion and said second potion each have a curved surface on a side of the cable restraint operable to prevent damage to a fiber optic cable in the cable restraint.

2. The cable restraint according to claim 1 wherein:
    said curved surface of said base portion, said curved surface of said first portion and said curved surface of said second portion define a smooth perimeter of said interior space.

3. The cable restraint according to claim 1 wherein:
    the radius of curvature of at least one of said curved surfaces is greater than a minimum bend radius of a fiber optic cable.

4. The cable restraint according to claim 1 wherein:
    said base portion has a flat side surface that is adapted for mounting to a cabinet of an optical communications device.

5. The cable restraint according to claim 4 wherein:
    said flat side surface has an alignment edge that is adapted to abut an edge of said cabinet.

6. A cable restraint for fiber optic cable management comprising:
    a base portion having a first end and a second end;
    a first portion having an open end and a closed end, said closed end in communication with said second end of said base portion;
    a second portion having an open end and a closed end, said closed end in communication with said first end of said base portion, such that said base portion, said first portion and said second portion define an interior space, and said open end of said first portion and said open end of said second portion define an open area that communicates with said interior space;
    a first pin extending from said open end of said first portion towards said open end of said second portion; and
    a second pin extending from said open end of said second portion towards said open end of said first portion and axially offset from said first pin;
    wherein an end of the first pin is closer to said open end of said second portion than an end of the second pin;

said open end of said first portion has a first interior facing surface having an inside edge and an outside edge; and said first pin extends from said first interior facing surface.

7. The cable restraint according to claim 6 wherein:

said first pin extending from said first interior facing surface is proximate said inside edge of said first interior facing surface and is proximate a curved surface of said first portion.

8. A cable restraint for fiber optic cable management comprising:

a base portion having a first end and a second end;

a first portion having an open end and a closed end, said closed end in communication with said second end of said base portion;

a second portion having an open end and a closed end, said closed end in communication with said first end of said base portion, such that said base portion, said first portion and said second portion define an interior space, and said open end of said first portion and said open end of said second portion define an open area that communicates with said interior space;

a first pin extending from said open end of said first portion towards said open end of said second portion; and a second pin extending from said open end of said second portion towards said open end of said first portion and axially offset from said first pin;

wherein an end of the first pin is closer to said open end of said second portion than an end of the second pin;

said open end of said second portion has a second interior facing surface having an inside edge and an outside edge; and said second pin extends from said second interior facing surface.

9. The cable restraint according to claim 8 wherein:

said second pin extending from said second interior facing surface is proximate said outside edge of said second interior facing surface and is proximate a flat surface of said second portion.

10. A cable restraint for fiber optic cable management comprising:

a body defining an interior space, the body having a curved surface that establishes a smooth perimeter of the interior space, a first end and a second end of said body defining an open area and providing access to said interior space;

a first pin extending from said first end of said body to partially obstruct said open area; and a second pin extending from said second end of said body to partially obstruct said open area; and wherein the body has a mounting surface adapted to abut a first substantially planar surface of a cabinet and an alignment edge adjacent the mounting surface and adapted to abut a second substantially planar surface of the cabinet, the mounting surface and alignment edge cooperating to align the cable restraint in relation to the cabinet.

11. The cable restraint according to claim 10 wherein:

an end portion of said first pin and an end portion of said second pin overlap such that a cable located within said interior space is prohibited from exiting through said open area by moving in a straight path.

12. The cable restraint according to claim 10 wherein:

said first pin and said second pin are axially offset from one another.

13. The cable restraint according to claim 10 wherein:

said first pin and said second pin are held in substantial rigid relation.

14. The cable restraint according to claim 10 wherein:

an axis of the first pin is substantially parallel to an axis of the second pin.

15. An optical communications system comprising:

a cabinet for housing an optical device and having a back wall, a first sidewall and a second side wall;

a first cable restraint affixed to said first sidewall, said first cable restraint defining an interior space having a curved surface operable to prevent damage to a fiber optic cable extending through the interior space, said first cable restraint having a downwardly extending pin axially offset from an upwardly extending pin, wherein an end of the downwardly extending pin is lower than an end of the upwardly extending pin;

a second cable restraint affixed to said second sidewall, said second cable restraint defining an interior space, said second cable restraint having a downwardly extending pin axially offset from an upwardly extending pin, wherein an end of the downwardly extending pin of the first pin is lower than an end of the upwardly extending pin; and at least one optical fiber extending through said interior space of one of said first cable restraint and said second cable restraint, said optical fiber retained within said interior space by said downwardly extending pin and said upwardly extending pin.

16. The optical communications system according to claim 15 wherein:

a perimeter of said interior space defined by the second cable restraint is smooth.

17. The optical communications system according to claim 15 wherein:

said first pin and said second pin of said second cable restraint are held in rigid relation.

18. The optical communications system according to claim 15 wherein:

an axis of said first pin is substantially parallel to an axis of said second pin on said second cable restraint.

19. The optical communications system of claim 15 wherein:

said second cable restraint has a curved surface defining a smooth perimeter of said interior space, and wherein the curved surface faces outwardly away from said first cable restraint.

* * * * *